United States Patent
Wu

(10) Patent No.: US 10,201,030 B2
(45) Date of Patent: Feb. 5, 2019

(54) DEVICE AND METHOD OF HANDLING DUAL CONNECTIVITY

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/792,776

(22) Filed: Oct. 25, 2017

(65) Prior Publication Data

US 2018/0124850 A1    May 3, 2018

Related U.S. Application Data

(60) Provisional application No. 62/413,994, filed on Oct. 28, 2016.

(51) Int. Cl.
*H04W 4/00* (2018.01)
*H04W 76/15* (2018.01)
(Continued)

(52) U.S. Cl.
CPC ......... *H04W 76/15* (2018.02); *H04W 72/042* (2013.01); *H04W 72/1205* (2013.01);
(Continued)

(58) Field of Classification Search
CPC ... H04W 76/15; H04W 76/27; H04W 72/042; H04W 72/1205; H04W 88/06; H04W 16/14; H04L 5/0035
(Continued)

(56) References Cited

U.S. PATENT DOCUMENTS

2015/0092750 A1*  4/2015  Huang .............. H04W 36/08
                                                         370/331
2015/0172971 A1*  6/2015  Zhao ............... H04W 36/0077
                                                         370/331
(Continued)

OTHER PUBLICATIONS

3GPP TS 36.331 V13.1.0 (Mar. 2016) Technical Specification 3rd Generation Partnership Project; Technical Specification Group Radio Access Network; Evolved Universal Terrestrial Radio Access (E-UTRA); Radio Resource Control (RRC); Protocol specification (Release 13).

(Continued)

*Primary Examiner* — Danh C Le
(74) *Attorney, Agent, or Firm* — Winston Hsu

(57) ABSTRACT

A method for handling dual connectivity comprises a first base station (BS) configuring a radio resource control (RRC) connection with a communication device via a first cell of the first BS; a second BS transmitting a secondary cell group (SCG) configuration to the first BS; the first BS transmitting a RRC message on the RRC connection via the first cell to the communication device, wherein the RRC message comprises the SCG configuration; the first BS receiving a RRC complete message from the communication device via the first cell or a second cell of the first BS; the first BS transmits a complete message to the second BS; and the second BS starting scheduling at least one transmission for the communication device, when the second BS receives the complete message and the SCG configuration indicates the communication device not to perform a random access procedure.

15 Claims, 3 Drawing Sheets

(51) Int. Cl.
*H04W 88/06* (2009.01)
*H04W 72/04* (2009.01)
*H04W 76/27* (2018.01)
*H04W 72/12* (2009.01)
*H04W 16/14* (2009.01)
*H04L 5/00* (2006.01)
*H04W 74/08* (2009.01)

(52) U.S. Cl.
CPC ........... *H04W 76/27* (2018.02); *H04W 88/06* (2013.01); *H04L 5/0035* (2013.01); *H04W 16/14* (2013.01); *H04W 74/0833* (2013.01)

(58) Field of Classification Search
USPC .......................... 370/331, 329, 328; 455/436
See application file for complete search history.

(56) References Cited

U.S. PATENT DOCUMENTS

| | | | | |
|---|---|---|---|---|
| 2015/0215826 A1* | 7/2015 | Yamada | ............ | H04W 36/0072 455/436 |
| 2015/0215944 A1* | 7/2015 | Kim | ........................ | H04L 5/001 370/329 |
| 2016/0198374 A1* | 7/2016 | Virtej | ..................... | H04W 76/15 455/444 |
| 2016/0338109 A1* | 11/2016 | Rahman | ............ | H04W 74/0833 |
| 2017/0111932 A1* | 4/2017 | Uemura | ............ | H04W 74/0833 |
| 2017/0188392 A1* | 6/2017 | Uchino | ............... | H04W 74/004 |
| 2017/0332437 A1* | 11/2017 | Yamada | ............. | H04W 72/042 |
| 2018/0049214 A1* | 2/2018 | Kubota | ............. | H04W 72/1215 |
| 2018/0160342 A1* | 6/2018 | Park | .................. | H04W 36/0072 |

OTHER PUBLICATIONS

3GPP TS 36.133 V13.3.0 (Mar. 2016) Technical Specification 3rd Generation Partnership Project; Technical Specification Group Radio Access Network; Evolved Universal Terrestrial Radio Access (E-UTRA); Requirements for support of radio resource management (Release 13), pp. 48-363.

\* cited by examiner

DEVICE AND METHOD OF HANDLING DUAL CONNECTIVITY

CROSS REFERENCE TO RELATED APPLICATIONS

This application claims the benefit of U.S. Provisional Application No. 62/413,994 filed on Oct. 28, 2016, which is incorporated herein by reference.

BACKGROUND OF THE INVENTION

1. Field of the Invention

The present invention relates to a device and a method used in a wireless communication system, and more particularly, to a device and a method of handling dual connectivity.

2. Description of the Prior Art

In a long-term evolution (LTE) system, a radio access network known as an evolved universal terrestrial radio access network (E-UTRAN) includes at least one evolved Node-B (eNB) for communicating with a user equipment (UE), and for communicating with a core network. The core network may include a mobility management and a Quality of Service (QoS) control for the UE.

SUMMARY OF THE INVENTION

The present invention therefore provides a communication device and method for handling dual connectivity to solve the abovementioned problem.

A method for handling dual connectivity comprises a first base station (BS) configuring a radio resource control (RRC) connection with a communication device via a first cell of the first BS; a second BS transmitting a secondary cell group (SCG) configuration to the first BS, wherein the SCG configuration changes a SCG; the first BS transmitting a RRC message on the RRC connection via the first cell to the communication device, wherein the RRC message comprises the SCG configuration; the first BS receiving a RRC complete message from the communication device via the first cell or a second cell of the first BS, wherein the communication device transmits the RRC complete message in response to the RRC message; the first BS transmits a complete message to the second BS in response to the RRC complete message; and the second BS starting scheduling at least one transmission for the communication device, when the second BS receives the complete message and the SCG configuration indicates the communication device not to perform a random access procedure.

A network for handling dual connectivity comprising a first base station (BS) and a second BS configured to perform the following instructions: the first BS configuring a radio resource control (RRC) connection with a communication device via a first cell of the first BS; the second BS transmitting a secondary cell group (SCG) configuration to the first BS, wherein the SCG configuration changes a SCG; the first BS transmitting a RRC message on the RRC connection via the first cell to the communication device, wherein the RRC message comprises the SCG configuration; the first BS receiving a RRC complete message from the communication device via the first cell or a second cell of the first BS, wherein the communication device transmits the RRC complete message in response to the RRC message; the first BS transmits a complete message to the second BS in response to the RRC complete message; and the second BS starting scheduling at least one transmission for the communication device, when the second BS receives the complete message and the SCG configuration indicates the communication device not to perform a random access procedure.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
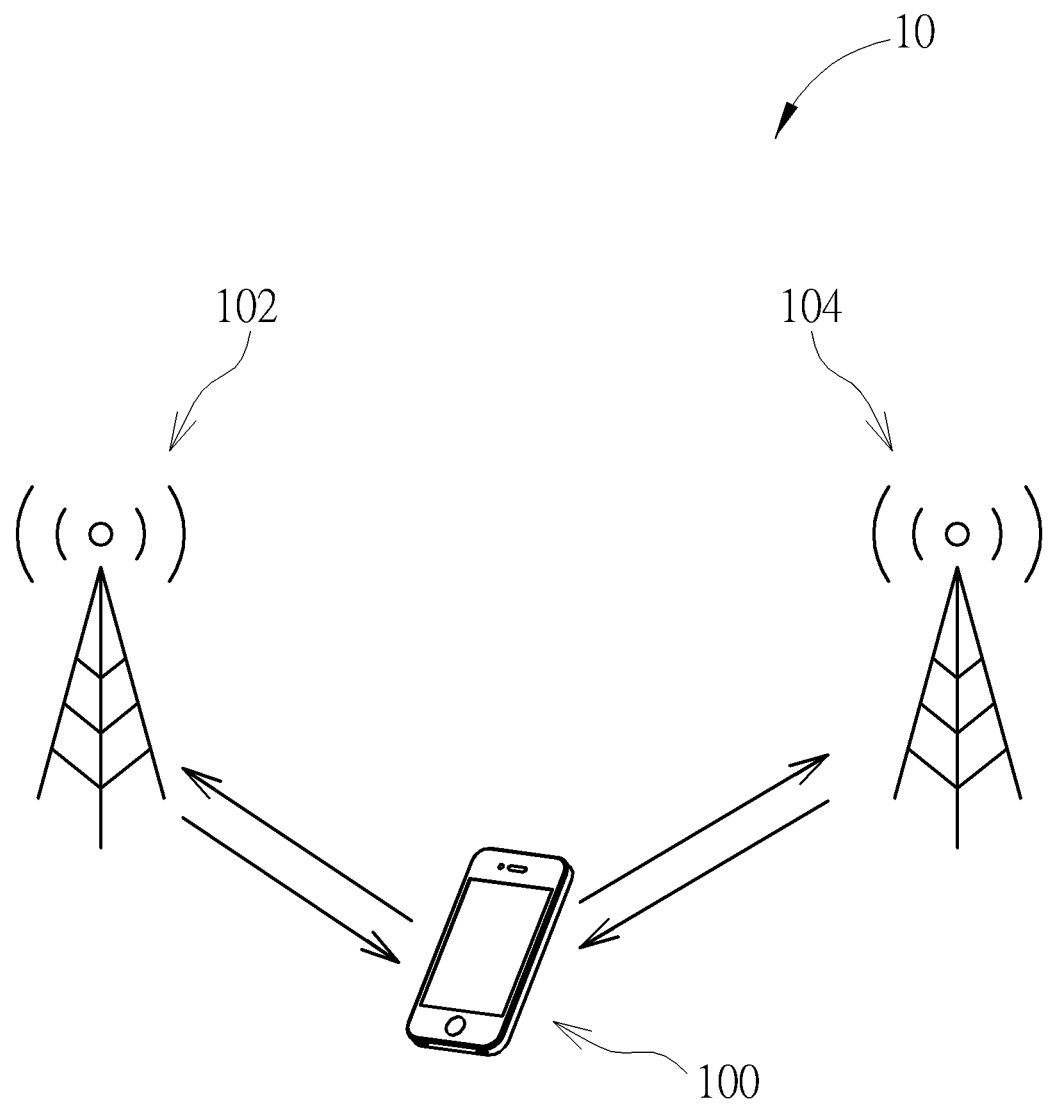
FIG. 1 is a schematic diagram of a wireless communication system according to an example of the present invention.

FIG. 1 is a schematic diagram of a wireless communication system 10 according to an example of the present invention. The wireless communication system 10 is composed of a communication device 100, base stations (BSs) 102 and 104. In FIG. 1, the communication device 100, the BSs 102 and 104 and are utilized for illustrating the structure of the wireless communication system 10. Practically, each of the BSs 102 and 104 may be an evolved Node-B (eNB) or a fifth generation (5G) (or called new radio (NR)) BS. The 5G (or NR) BS may support orthogonal frequency-division multiplexing (OFDM), filtered OFDM (F-OFDM), Generalized Frequency Division Multiplexing (GFDM), Universal Filtered MultiCarrier (UFMC), Filter Bank Multi-Carrier (FBMC) and/or non-OFDM. The 5G (or NR) BS may support a transmission time interval (TTI) shorter than 1 ms (e.g., 100 or 200 microseconds) and a wider system bandwidth (e.g., 100 or 200 MHz). In FIG. 1, coverage areas of the BS 102 and the BS 104 may be overlapped or non-overlapped. In general, a BS may also be used to refer any of the eNB and the 5G BS.

As shown in FIG. 1, the communication device 100 may be configured to communicate with the BSs 102 and 104 simultaneously according to dual connectivity. That is, the communication device 100 may perform a transmission/reception via both the BSs 102 and 104. For example, the communication device 100 may transmit and/or receive packets (e.g., protocol data units (PDUs)) to and/or from the BS 102 via at least one cell of the BS 102, while the communication device 100 may transmit and/or receive packets (e.g., PDUs) to and/or from the BS 104 via at least one cell of the BS 104. In addition, one of the BSs 102 and 104 may be a master BS (MBS) and the other BS may be a secondary BS (SBS). One of the cell(s) of the MBS may be a primary cell (PCell) for the communication device 100. The other cell(s) (if available) of the MBS may be secondary cell(s) (SCell(s)) for the communication device 100. One of the cell(s) of the SBS may be a primary SCell (PSCell) for the communication device 100. The other cell(s) (if available) of the SBS may be SCell(s) for the communication device 100.

Technical terms related to the examples in the present invention are explained as follows to simplify description of successive examples. The dual connectivity may be an operation mode of a communication device in RRC_CONNECTED, which is configured with a master cell group (MCG) and a secondary cell group (SCG) to the communication device. A MBS may be an eNB or a 5G BS. A SBS may be an eNB or a 5G BS which provides additional radio resources but is not a MBS. A MCG may include the PCell and the SCell(s) of the MBS if the SCell(s) is configured to the communication device. A SCG may include the PSCell and the SCell(s) of the SBS if the SCell(s) is configured to the communication device. A MCG bearer may be a radio bearer whose radio protocols are only located in a MBS to use MBS resources only. A SCG bearer may be a radio bearer whose radio protocols are only located in a SBS to use SBS resources. A split bearer may be a bearer whose radio protocols are located in both the MBS and the SBS to use both MBS and SBS resources.

In dual connectivity (DC), the radio protocol architecture that a particular radio bearer uses depends on how the bearer is setup. There three bearer types: MCG bearer, SCG bearer and split bearer. A radio resource control (RRC) is located in MeNB and SRBs are always configured as MCG bearer type and therefore only use the radio resources of the MeNB.

The communication device 100 may be a user equipment (UE), a mobile phone, a laptop, a tablet computer, an electronic book, a portable computer system, a vehicle, or an airplane. For uplink (UL), the communication device 100 is the transmitter and the BS 102 and/or the BS 104 is the receiver, and for downlink (DL), the BS 102 and/or the BS 104 is the transmitter and the communication device 100 is the receiver.

Figure 2:
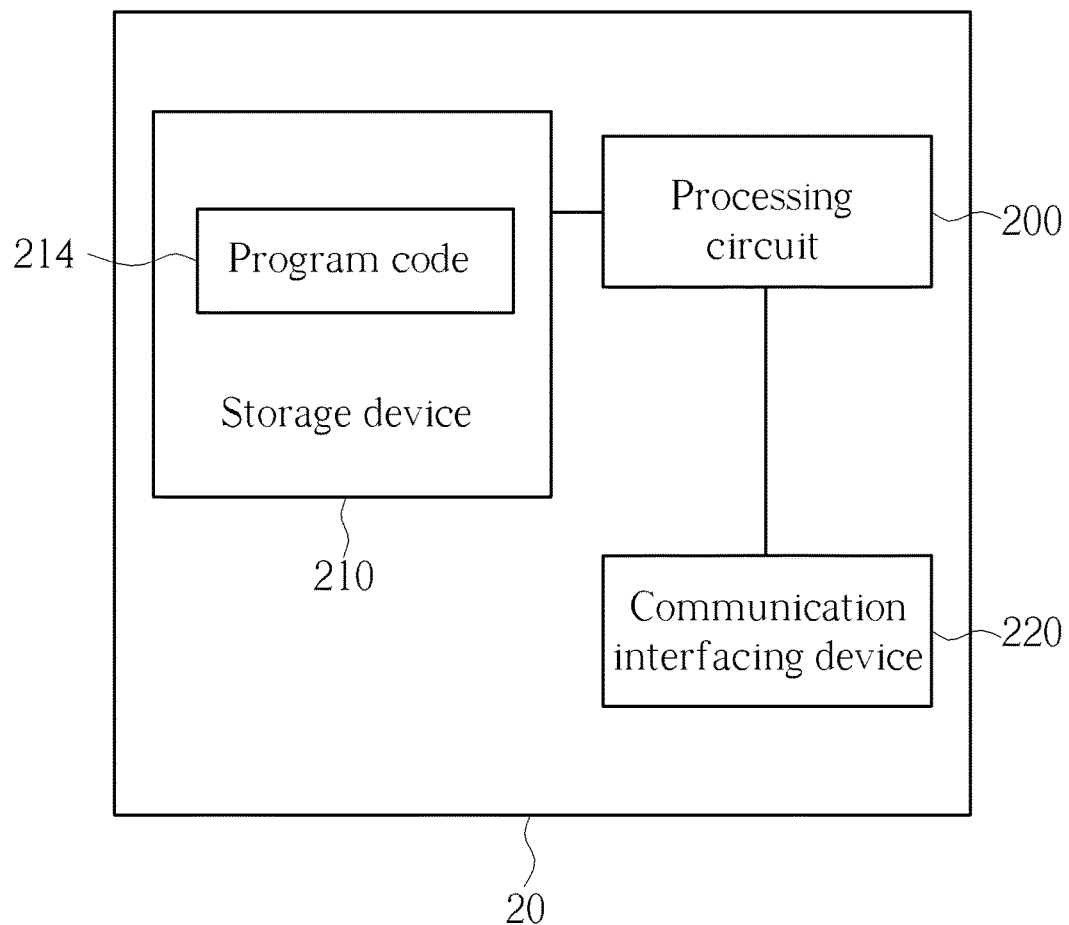
FIG. 2 is a schematic diagram of a communication device according to an example of the present invention.

FIG. 2 is a schematic diagram of a communication device 20 according to an example of the present invention. The communication device 20 may be the communication device 100, the BS 102 or the BS 104 shown in FIG. 1, but is not limited herein. The communication device 20 may include a processing circuit 200 such as a microprocessor or Application Specific Integrated Circuit (ASIC), a storage device 210 and a communication interfacing device 220. The storage device 210 may be any data storage device that may store a program code 214, accessed and executed by the processing circuit 200. Examples of the storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The communication interfacing device 220 includes a transceiver used to transmit and receive signals (e.g., data, messages and/or packets) according to processing results of the processing circuit 200. The BS 102 and the BS 104 may belong to (e.g., is managed/controlled by) a network to perform steps or instructions for realizing the following examples.

In the following examples, a UE is used to represent a communication device in FIG. 1, to simplify the illustration of the embodiments.

Figure 3:
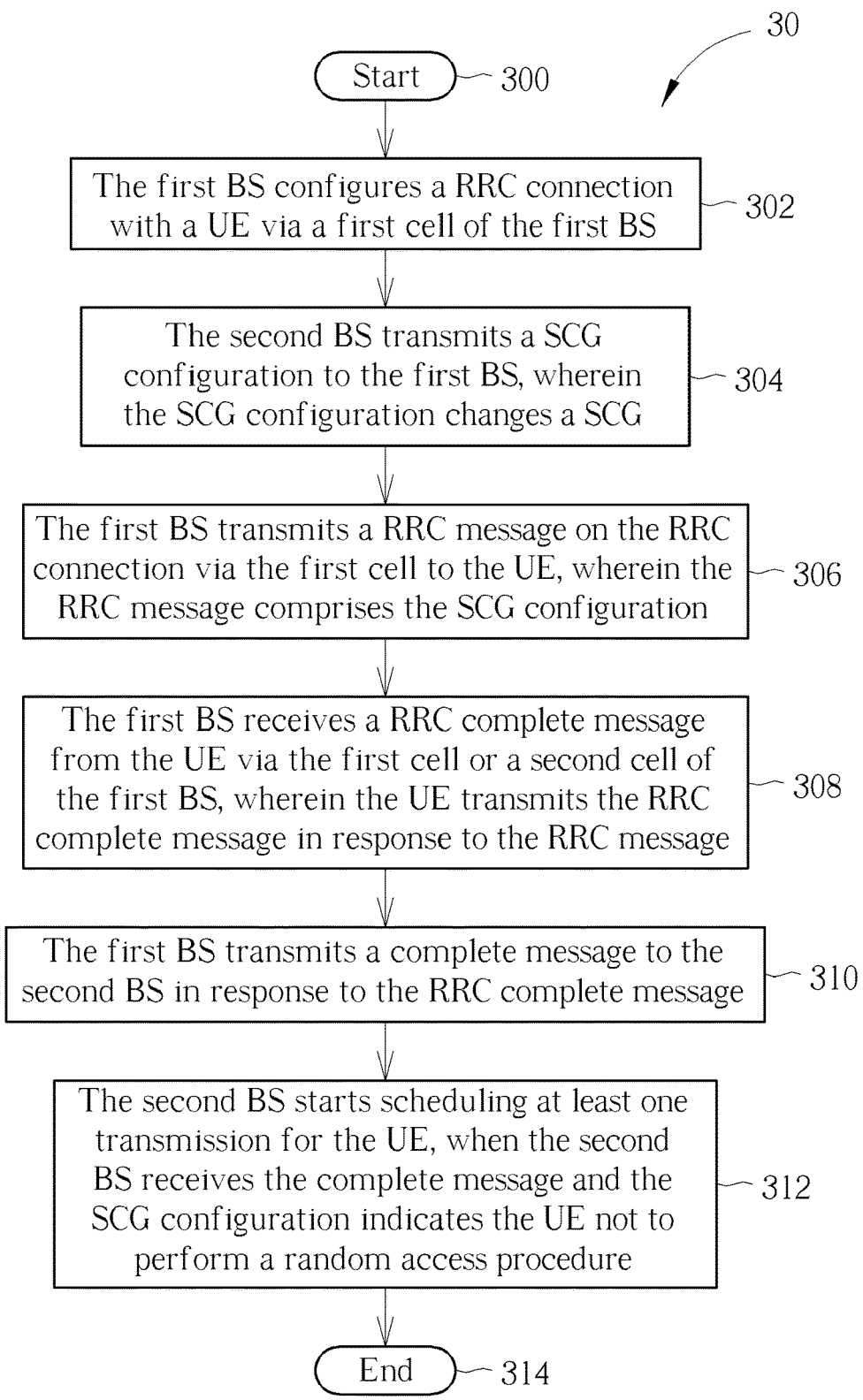
FIG. 3 is a flowchart of a process according to an example of the present invention.

FIG. 3 is a flowchart of a process 30 according to an example of the present invention. The process 30 is utilized in a first BS (e.g., the BS 102) and a second BS (e.g., the BS 104), to handle dual connectivity. The process 30 includes the following steps:

Step 300: Start.

Step 302: The first BS configures a RRC connection with a UE via a first cell of the first BS.

Step 304: The second BS transmits a SCG configuration to the first BS, wherein the SCG configuration changes a SCG.

Step 306: The first BS transmits a RRC message on the RRC connection via the first cell to the UE, wherein the RRC message comprises the SCG configuration.

Step 308: The first BS receives a RRC complete message from the UE via the first cell or a second cell of the first BS, wherein the UE transmits the RRC complete message in response to the RRC message.

Step 310: The first BS transmits a complete message to the second BS in response to the RRC complete message.

Step 312: The second BS starts scheduling at least one transmission for the UE, when the second BS receives the complete message and the SCG configuration indicates the UE not to perform a random access procedure.

Step 314: End.

According to the process 30, the first BS configures a RRC connection with a UE via a first cell of the first BS. The second BS transmits a SCG configuration to the first BS, wherein the SCG configuration changes a SCG (i.e., SCG change). The first BS transmits a RRC message (e.g., RRC Connection Reconfiguration) on the RRC connection via the first cell to the UE, wherein the RRC message comprises the SCG configuration. The first BS receives a RRC complete message (e.g., RRC Connection Reconfiguration Complete) from the UE via the first cell or a second cell of the first BS, wherein the UE transmits the RRC complete message in response to the RRC message. The first BS transmits a complete message to the second BS in response to the RRC complete message. Then, the second BS starts scheduling at least one transmission for the UE, when the second BS receives the complete message and the SCG configuration indicates the UE not to perform a random access procedure. That is, the second BS knows when to start scheduling the at least one transmission according to the complete message and the SCG configuration, even if the UE does not perform the random access procedure. Thus, the process 30 provides a solution for the second BS to start scheduling the at least one transmission for the UE in dual connectivity.

Realization of the process 30 is not limited to the above description. The following examples may be applied to the process 30.

In one example, the second BS starts scheduling the at least one transmission for the UE, when the SCG configuration indicates the UE to perform the random access procedure and the second BS detects the random access procedure performed by the UE.

In one example, the second BS starts scheduling the at least one transmission for the UE, when the second BS receives a transmission from the UE and the SCG configuration indicates the UE not to perform the random access procedure, wherein the UE transmits the transmission according to a UL grant comprised in the RRC message.

In one example, the second BS starts scheduling the at least one transmission for the UE, when receives the complete message from the first BS, the second BS does not receive a buffer status report (BSR) from the UE and the SCG configuration indicates the UE not to perform the random access procedure.

In one example, the first BS transmits a SBS Addition Request message to the second BS to request the second BS to serve the UE in dual connectivity with the first BS. Then, the second BS transmits the SCG configuration in a SBS Addition Request Acknowledge message for a SCG establishment in response to the SBS Addition Request message.

In one example, the UE has simultaneously connected to the first BS and the second BS. The first BS transmits a SBS Modification Request message to the second BS. Then, the second BS transmits the SCG configuration indicating a PSCell change in a SBS Modification Request Acknowledge message in response to the SBS Modification Request message.

In one example, the UE has simultaneously connected to the first BS and the second BS. In this case, the second BS transmits the SCG configuration indicating a SCG change (e.g., in a SeNB Modification Required) to the first BS, when the second BS determines to change the SCG, e.g., due to changing the PSCell or refreshing security key(s).

In one example, the second BS starts scheduling the at least one transmission for the UE by transmitting a physical DL control channel (PDCCH) comprising a DL control information (DCI) with a cyclic redundancy check (CRC) scrambled with a Cell Radio Network Temporary Identifier (C-RNTI) of the UE on a cell of the second BS. In one example, the DCI includes a modulation and coding scheme (MCS), a resource block assignment and hybrid automatic repeat request (HARQ) information (e.g., new data indicator, redundancy version, and/or HARQ process number). In one example, the DCI schedules a physical DL shared channel (PDSCH) transmission. The UE decodes the PDCCH with the CRC scrambled with the C-RNTI to get the DCI, and receives the PDSCH transmission according to the DCI. In one example, the DCI schedules a physical UL shared channel (PUSCH) transmission. The UE decodes the PDCCH with the CRC scrambled with the C-RNTI to get the DCI, and transmits the PUSCH transmission according to the DCI.

In one example, the second BS schedules the at least one transmission for the UE as soon as possible, when the second BS receives the complete message from the first BS and the SCG configuration indicates the UE not to perform the random access procedure. In one example, the second BS schedules the at least one transmission for the UE immediately, when the second BS receives the complete message and the SCG configuration indicates the UE not to perform the random access procedure. In one example, the second BS schedules the at least one transmission for the UE, when the SCG configuration indicates the UE not to perform the random access procedure in a time duration after the second BS receives the complete message. The second BS may determine the time duration by considering a time interval needed by the UE to be ready to receive a PDCCH on a cell of the second BS.

In one example, if the RRC message includes a UL grant for the UE to transmit a PUSCH transmission on a cell of the second BS, the second BS schedules the at least one transmission for the UE when the second BS receives the PUSCH transmission which is transmitted by the UE according to the UL grant. The PUSCH transmission may include a Medium Access Control (MAC) PDU. It should be noted that the UE may have to transmit the PUSCH transmission even the UE has no data in its buffer. In this case, the MAC PDU may include MAC subheader(s) but does not include a MAC Service Data Unit (SDU) or the MAC PDU may include MAC subheader(s) and include a dummy MAC SDU. The dummy MAC SDU may be generated for stuffing the MAC PDU, or may be generated for stuffing the PUSCH transmission.

In one example, the UL grant indicates time resource(s) and/or frequency resource(s) for the UE to perform the at least one transmission. In one example, the UL grant includes a DCI and indicates a transmission unit (e.g., slot or subframe) number. The UE transmits the at least one transmission in a subframe indicated by the transmission unit number according to the DCI.

In one example, when the SCG configuration indicates the UE to perform the random access procedure, the UE transmits a random access preamble to the second BS via a cell of the second BS. When the second BS receives the random access preamble, the second BS transmits a random access response (RAR) to the UE via the cell in response to the random access preamble. In one example, the SCG configuration indicates whether the UE reestablishes a radio link control (RLC) or a Packet Data Convergence Protocol associated to a radio bearer (e.g., SCG bearer or split bearer).

In one example, the second BS detects the random access procedure performed by the UE, when the second BS receives a random access preamble transmitted by the UE via a cell of the second BS. The random access preamble may be a dedicated preamble assigned by the second BS in the SCG configuration to the UE. Thus, the second BS detects the UE upon receiving the dedicated preamble, and transmits a RAR to the UE. Then, the second BS starts scheduling the at least one transmission for the UE as described above.

In one example, the second BS detects the random access procedure performed by the UE, when the second BS receives a message 3 (Msg3) of the random access procedure from the UE. The UE transmits the Msg3 by using a UL grant assigned in a RAR. The RAR is transmitted by the second BS to respond to a random access preamble of the random access procedure transmitted by the UE. The Msg3 may include a C-RNTI of the UE. Thus, the second BS detects the UE upon receiving the Msg3, and starts scheduling the at least one transmission for the UE as described above. In one example, the second BS may start scheduling the PUSCH transmission as described above, when receiving the Msg3.

In one example, the UE starts a timer (e.g., T307), when receiving the RRC message. In one example, the UE may stop the timer, when the UE transmits a PUSCH transmission or when the UE transmits the PUSCH transmission and receives an acknowledgement for the PUSCH transmission or data in the PUSCH transmission. ABS (e.g., the second BS) schedules a PUSCH transmission, when the BS receives a BSR from the UE and the BSR indicates that the UE has data in its buffer for a transmission. However, the UE may not have data to for the transmission to the second BS in dual connectivity, and may only receive data from the second BS before expiry of the timer. Therefore, the second BS starts scheduling the PUSCH transmission for the UE even when the second BS does not receive the BSR from the UE. That is, when the second BS receives the complete message from the first BS, the second BS may start scheduling the PUSCH transmission for the UE without knowing a buffer status of the UE. Thus, the UE transmits the PUSCH transmission or receives the acknowledgement for the PUSCH transmission early such that the UE stops the timer early. This avoids that the timer expires before the UE transmits the PUSCH transmission, and the UE determines a SCG failure occurred due to the expiry of the timer.

In one example, the SCG configuration changes the SCG (i.e., SCG change). The SCG change is used in a number of different scenarios, e.g., a SCG establishment (e.g., SCG addition), a PSCell change, a Key refresh, a change of RB type or a synchronous reconfiguration. The SCG configuration or the RRC message may include an indicator indicating not/no need to perform the random access procedure. If the RRC message does not include the indicator, the UE performs the random access procedure for the SCG change.

In one example, the PDCCH may refer to a PDCCH, an enhanced PDCCH (EPDCCH) or a short PDCCH. A BS may schedule a DL transmission or a UL transmission for the UE by transmitting a DCI with a CRC scrambled by a C-RNTI of the UE on the PDCCH. The DCI may include a DL assignment for the DL transmission. The DCI may include a UL grant for the UL transmission.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program code 214.

To sum up, the present invention provides a method and a communication device for handling dual connectivity. ABS knows when to start scheduling at least one transmission according to a complete message, a SCG configuration, a transmission from the communication device and/or a BSR from the communication device, even if the communication device does not perform a random access procedure. Thus, communications between the communication device and the BS can proceed regularly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for handling dual connectivity, comprising:
a first base station (BS) configuring a radio resource control (RRC) connection with a communication device via a first cell of the first BS;
a second BS transmitting a secondary cell group (SCG) configuration to the first BS, wherein the SCG configuration changes a SCG;
the first BS transmitting a RRC message on the RRC connection via the first cell to the communication device, wherein the RRC message comprises the SCG configuration;
the first BS receiving a RRC complete message from the communication device via the first cell or a second cell of the first BS, wherein the communication device transmits the RRC complete message in response to the RRC message;
the first BS transmits a complete message to the second BS in response to the RRC complete message; and
the second BS starting scheduling at least one transmission for the communication device, when the second BS receives the complete message and the SCG configuration indicates the communication device not to perform a random access procedure.

2. The method of claim 1, further comprising:
the second BS starting scheduling the at least one transmission for the communication device, when the SCG configuration indicates the communication device to perform the random access procedure and the second BS detects the random access procedure performed by the communication device.

3. The method of claim 1, further comprising:
the second BS starting scheduling the at least one transmission for the communication device, when the second BS receives a transmission from the communication device and the SCG configuration indicates the communication device not to perform the random access procedure, wherein the communication device transmits the transmission according to an uplink (UL) grant comprised in the RRC message.

4. The method of claim 1, further comprising:
the second BS starting scheduling the at least one transmission for the communication device, when receives the complete message from the first BS, the second BS does not receive a buffer status report (BSR) from the communication device and the SCG configuration indicates the communication device not to perform the random access procedure.

5. The method of claim 1, further comprising:
the first BS transmitting an addition request to the second BS to request the second BS to serve the communication device in dual connectivity with the first BS; and
the second BS transmitting the SCG configuration for a SCG establishment in response to the addition request.

6. The method of claim 1, further comprising:
the first BS transmitting a modification request to the second BS; and
the second BS transmitting the SCG configuration indicating a primary secondary cell (PSCell) change in response to the modification request.

7. The method of claim 1, wherein the second BS starts scheduling the at least one transmission for the communication device by transmitting a physical downlink (DL) control channel (PDCCH) comprising a DL control information (DCI) with a cyclic redundancy check (CRC) scrambled with a Cell Radio Network Temporary Identifier (C-RNTI) of the communication device on a cell of the second BS.

8. The method of claim 1, wherein the second BS starts scheduling the at least one transmission for the communication device, when the second BS receives the complete message and the SCG configuration indicates the communication device not to perform the random access procedure in a time duration after the second BS receives the complete message.

9. The method of claim 1, further comprising:
the second BS receiving a random access preamble from the communication device, wherein the SCG configuration indicates the communication device to perform the random access procedure; and
the second BS transmitting a random access response (RAR) to the communication device via a cell of the second BS in response to the random access preamble.

10. The method of claim 1, further comprising:
the second BS detects the random access procedure performed by the communication device, when the second BS receives a message 3 (Msg3) of the random access procedure from the communication device.

11. A network for handling dual connectivity comprising a first base station (BS) and a second BS configured to perform the following instructions:
the first BS configuring a radio resource control (RRC) connection with a communication device via a first cell of the first BS;
the second BS transmitting a secondary cell group (SCG) configuration to the first BS, wherein the SCG configuration changes a SCG;
the first BS transmitting a RRC message on the RRC connection via the first cell to the communication device, wherein the RRC message comprises the SCG configuration;

the first BS receiving a RRC complete message from the communication device via the first cell or a second cell of the first BS, wherein the communication device transmits the RRC complete message in response to the RRC message;

the first BS transmits a complete message to the second BS in response to the RRC complete message; and the second BS starting scheduling at least one transmission for the communication device, when the second BS receives the complete message and the SCG configuration indicates the communication device not to perform a random access procedure.

12. The network of claim 11, wherein the second BS is configured to perform the following instruction:

starting scheduling the at least one transmission for the communication device, when the SCG configuration indicates the communication device to perform the random access procedure and the second BS detects the random access procedure performed by the communication device.

13. The network of claim 11, wherein the second BS is configured to perform the following instruction:

starting scheduling the at least one transmission for the communication device, when the second BS receives a transmission from the communication device and the SCG configuration indicates the communication device not to perform the random access procedure, wherein the communication device transmits the transmission according to an uplink (UL) grant comprised in the RRC message.

14. The network of claim 11, wherein the second BS is configured to perform the following instruction:

starting scheduling the at least one transmission for the communication device, when receives the complete message from the first BS, the second BS does not receive a buffer status report (BSR) from the communication device and the SCG configuration indicates the communication device not to perform the random access procedure.

15. The network of claim 11, wherein the second BS is configured to perform the following instruction:

receiving a random access preamble from the communication device, wherein the SCG configuration indicates the communication device to perform the random access procedure; and transmitting a random access response (RAR) to the communication device via a cell of the second BS in response to the random access preamble.

* * * * *